United States Patent
Sacco et al.

(10) Patent No.: US 9,322,911 B1
(45) Date of Patent: Apr. 26, 2016

(54) PASSIVE PHASED ARRAY IMAGER USING SUB-PHASE SAMPLING CMOS DETECTORS AND A SMART ROIC

(71) Applicant: EXELIS, INC., McLean, VA (US)

(72) Inventors: Andrew Paul Sacco, Pittsford, NY (US); Jeffrey Daniel Newman, Pittsford, NY (US); Paul Poo-Kam Lee, Pittsford, NY (US)

(73) Assignee: Exelis, Inc., Herndon, VA (US)

( * ) Notice: Subject to any disclaimer, the term of this patent is extended or adjusted under 35 U.S.C. 154(b) by 630 days.

(21) Appl. No.: 14/010,883

(22) Filed: Aug. 27, 2013

(51) Int. Cl.
*G01S 13/89* (2006.01)
*H01Q 3/34* (2006.01)
*H01P 1/20* (2006.01)
*G01S 13/02* (2006.01)

(52) U.S. Cl.
CPC . *G01S 13/89* (2013.01); *H01P 1/20* (2013.01); *H01Q 3/34* (2013.01); *G01S 2013/0263* (2013.01)

(58) Field of Classification Search
CPC . G01S 13/89; G01S 2013/0245; G01S 7/032; H01Q 3/34; H01P 1/20
USPC .......................................................... 342/179
See application file for complete search history.

(56) References Cited

U.S. PATENT DOCUMENTS

| | | | | |
|---|---|---|---|---|
| 5,694,134 A | * | 12/1997 | Barnes | H01G 7/06 333/161 |
| 6,020,848 A | * | 2/2000 | Wallace | H01Q 3/30 330/296 |
| 7,170,442 B2 | * | 1/2007 | Lovberg | G01V 8/005 250/332 |
| 7,522,095 B1 | * | 4/2009 | Wasiewicz | G01S 13/424 342/160 |
| 8,456,351 B2 | * | 6/2013 | Kam | G01S 13/89 342/175 |
| 8,586,926 B2 | * | 11/2013 | Black | H01L 27/14603 250/338.1 |
| 2003/0122079 A1 | * | 7/2003 | Pobanz | H01L 27/14649 250/336.1 |
| 2008/0026796 A1 | * | 1/2008 | Thomas | H04B 7/08 455/562.1 |
| 2008/0100504 A1 | * | 5/2008 | Martin | H01Q 21/064 342/179 |
| 2008/0143636 A1 | * | 6/2008 | Couchman | B64G 1/66 343/915 |
| 2010/0301217 A1 | * | 12/2010 | Sertel | G01J 1/4228 250/338.4 |
| 2010/0328142 A1 | * | 12/2010 | Zoughi | G01S 7/025 342/179 |
| 2013/0050022 A1 | * | 2/2013 | Feger | H01Q 9/0407 342/368 |
| 2014/0015329 A1 | * | 1/2014 | Widmer | G01D 5/2006 307/104 |
| 2014/0231648 A1 | * | 8/2014 | Kotter | G01J 3/42 250/339.02 |

* cited by examiner

Primary Examiner — Jack W Keith
Assistant Examiner — Marcus Windrich
(74) Attorney, Agent, or Firm — RatnerPrestia

(57) ABSTRACT

A passive phased array imager includes a plurality of antennas, disposed on a substrate, for receiving a wavefront from a target; and a coplanar waveguide, disposed in the substrate and coupled to the plurality of antennas. Also included is a plurality of detectors, disposed across the coplanar waveguide for sampling the received wavefront, and providing multiple output voltages to an imaging circuit for displaying information contained in the received wavefront. The plurality of antennas includes at least two dipoles coupled to the coplanar waveguide, and the two dipoles are spaced by a predetermined length to provide a standing wave at a frequency of interest.

17 Claims, 17 Drawing Sheets

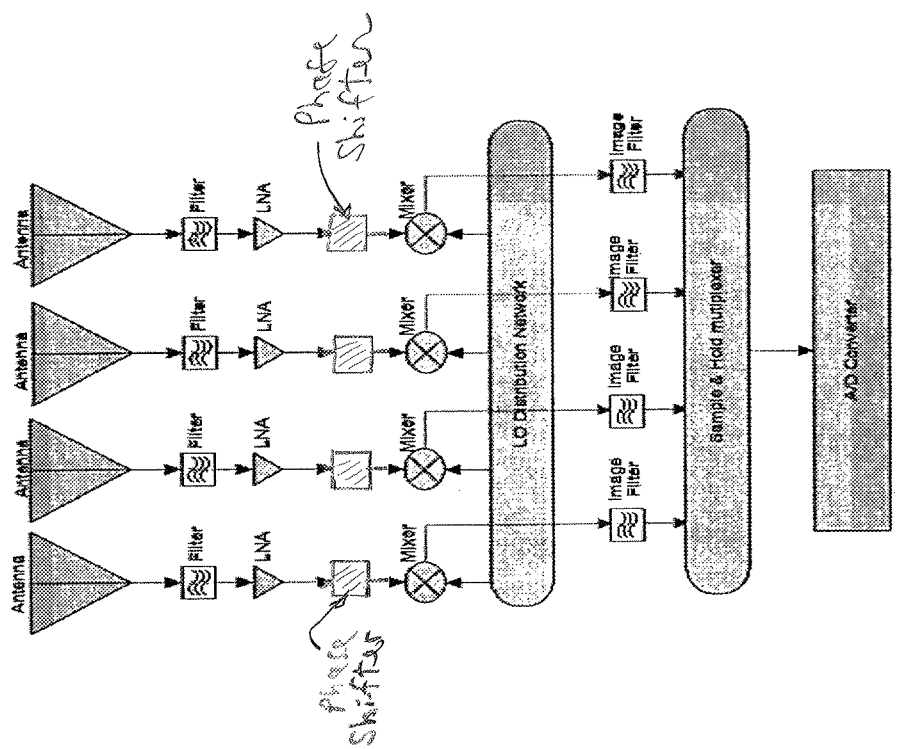

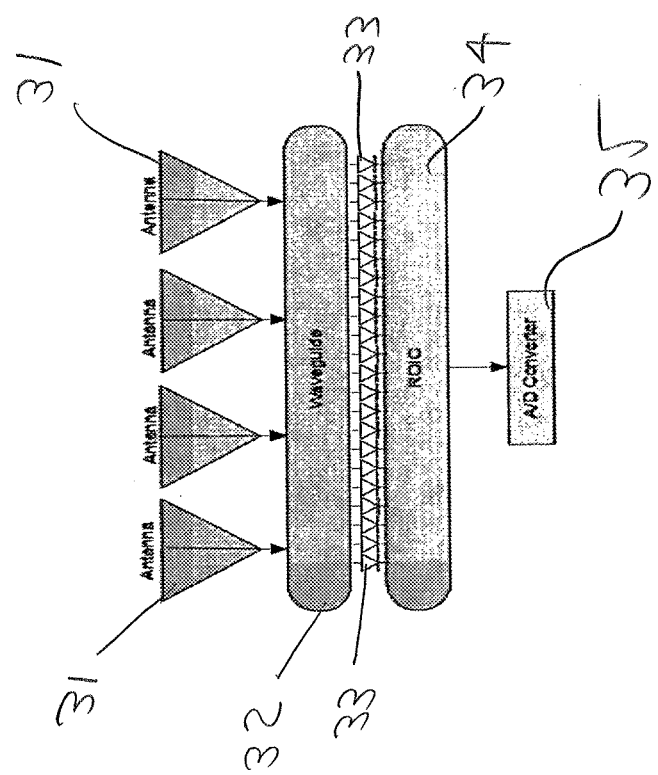

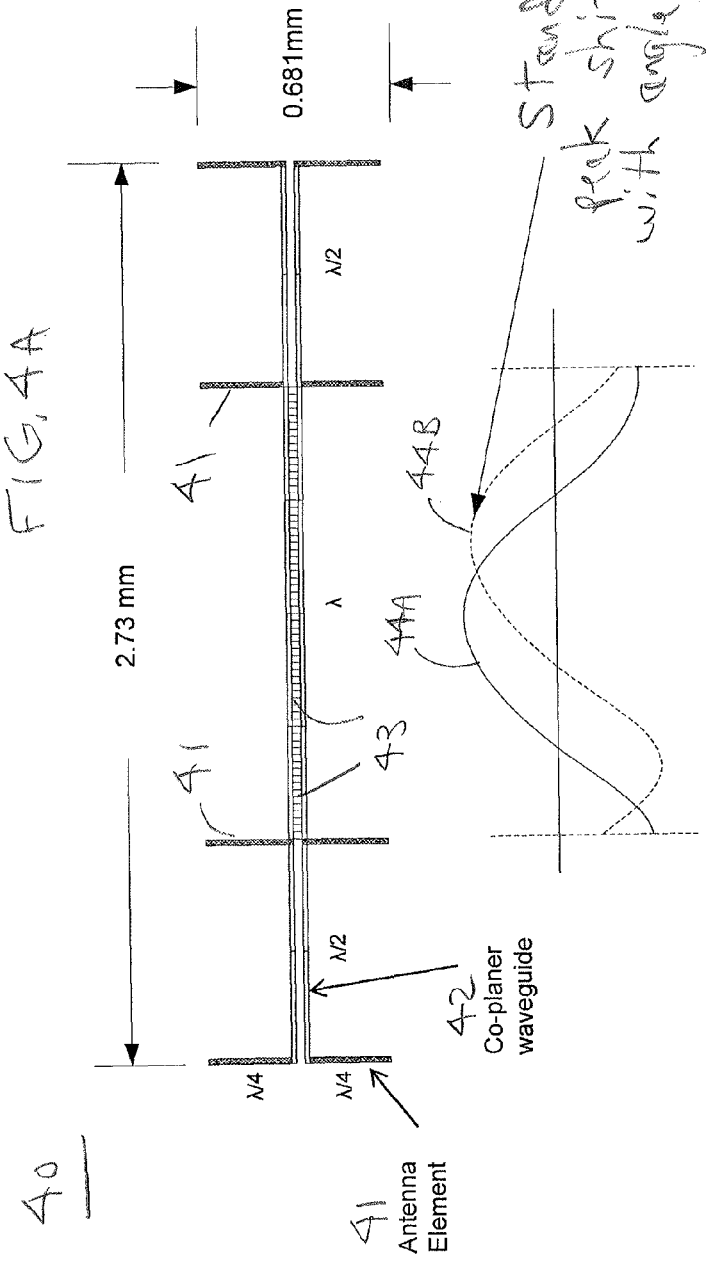

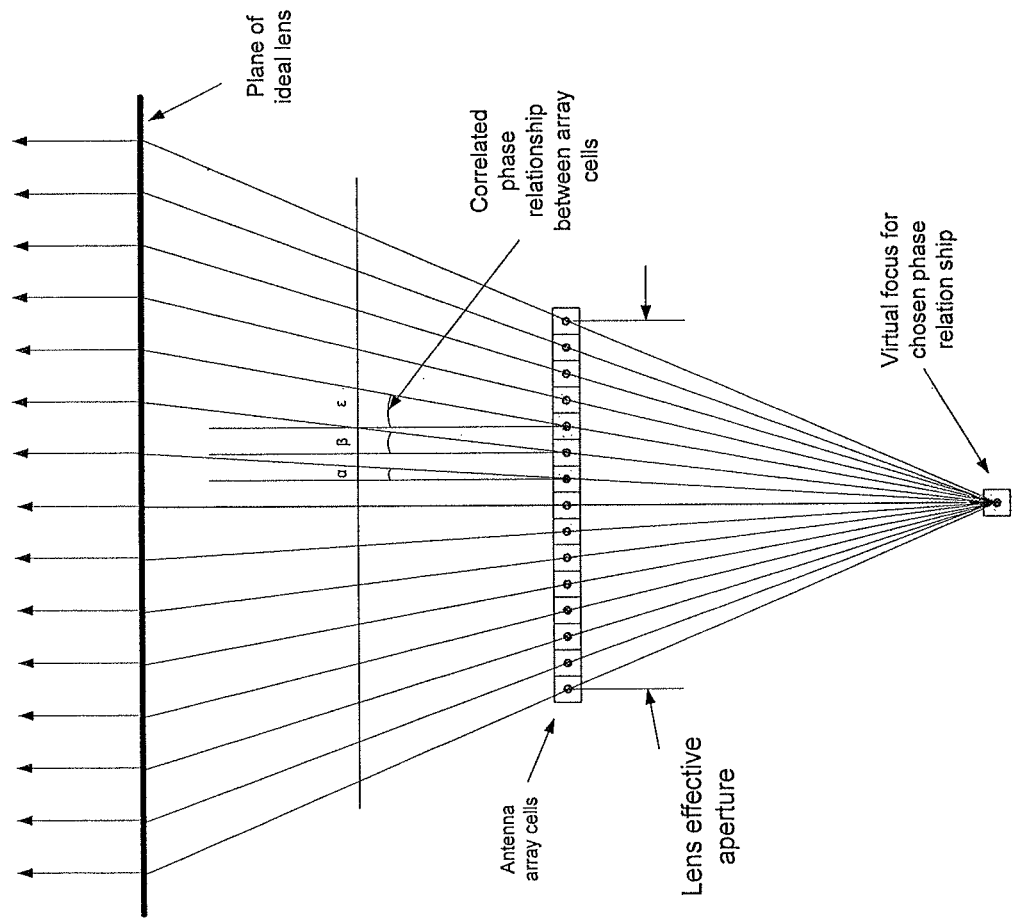

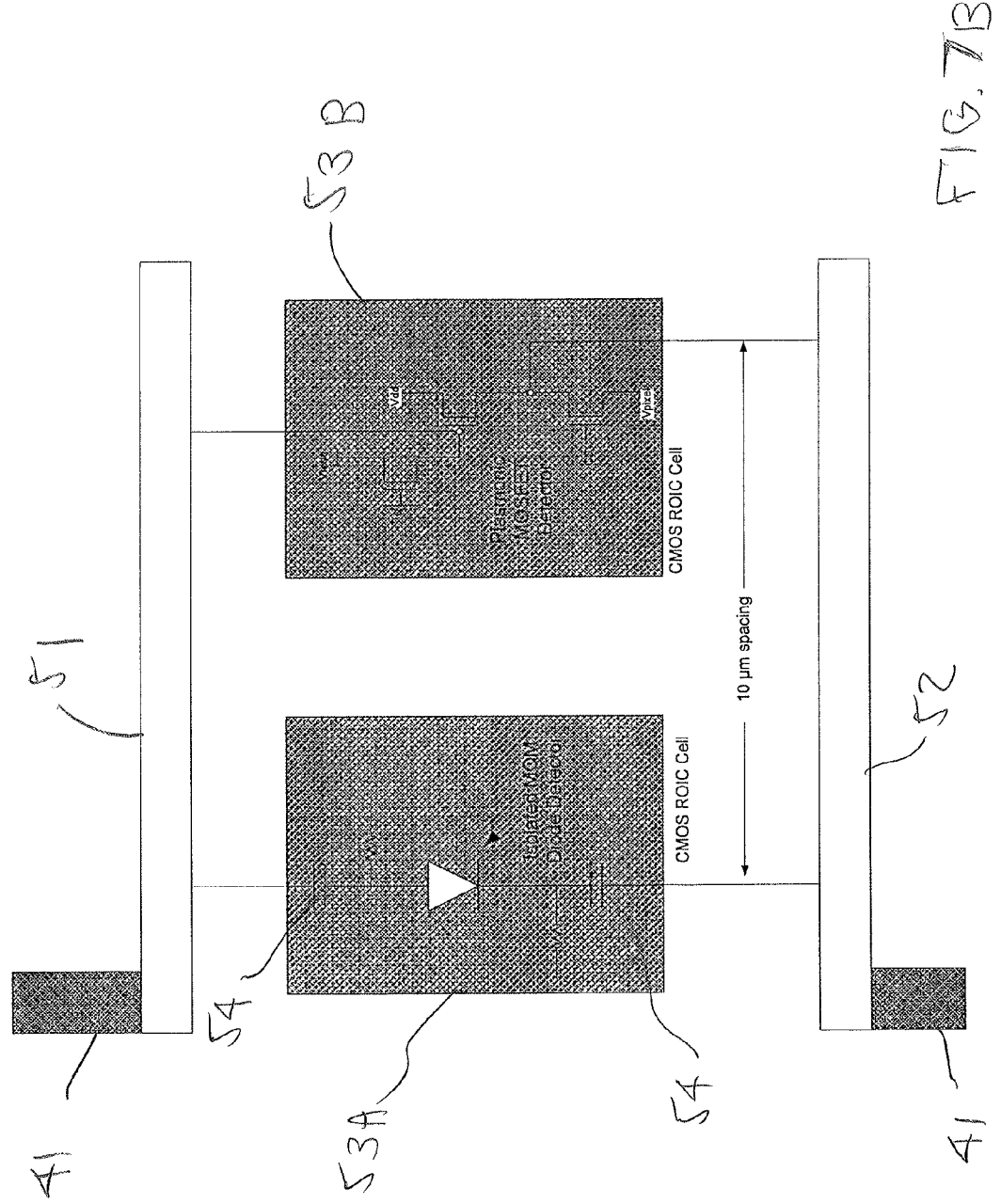

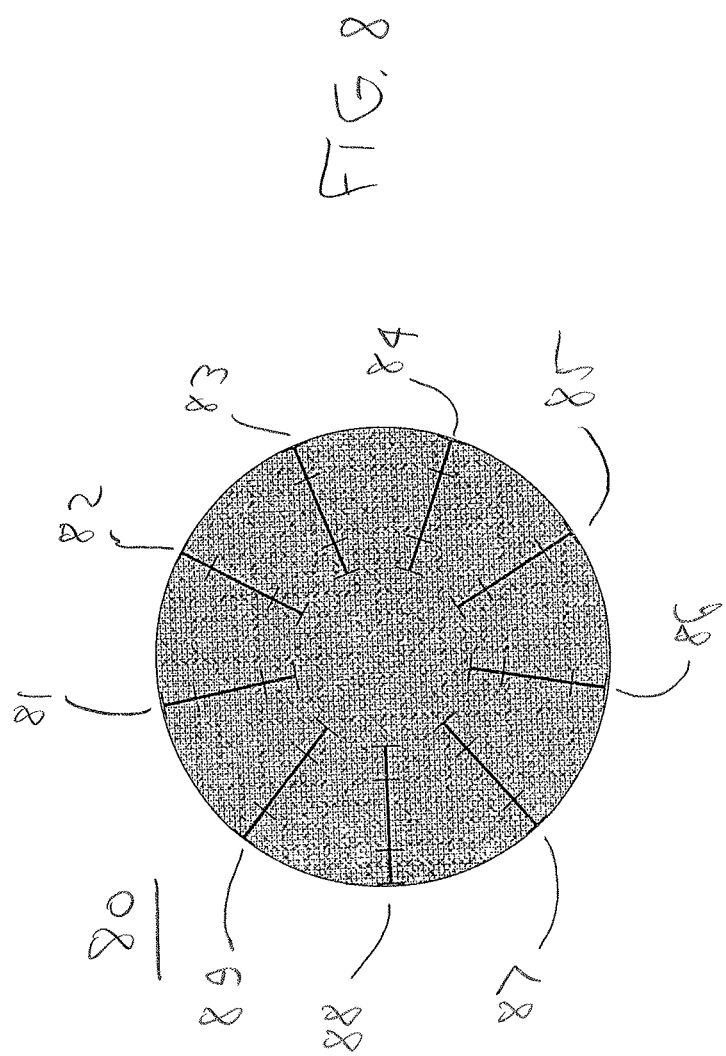

Actual beam pattern of nine element arrays

Equivalent beam pattern of digital lens

PASSIVE PHASED ARRAY IMAGER USING SUB-PHASE SAMPLING CMOS DETECTORS AND A SMART ROIC

FIELD OF THE INVENTION

The present invention relates, in general, to passive phased arrays. More specifically, the present invention relates to an array of antennas arranged across a coplanar waveguide (CPW) structure having multiple detectors for oversampling an incoming signal to form an image.

BACKGROUND OF THE INVENTION

Phased array antennas have proven overly complex and expensive. The antennas use passive or active elements which produce a fixed amount of phase shift, and which must be independently switched into or out of the antenna feed structure and control network. This significantly increases cost, complexity, weight and size of the antenna system.

Current phased array imaging systems require each antenna element to have its own, low noise amplifier (LNA), narrow band filter, mixer and local oscillator (LO), in which the LO must be phase synchronized with all the antennas in the array. In a radio telescope array, the phase must be closed across of the aperture (length of the baseline). In order to produce an image, both the amplitude and phase distribution across the wavefront must be determined. Using a coherent source and receiving antennas placed on ½ wavefront intervals, discrete samples of the amplitude and phase can be collected and processed. By determining the magnitude and direction of the phase fronts, each phase center can be interpreted as a pixel in forming an image of sources in the far field (image quality would be dependent on the amount of coherence in the wave front).

The excessive requirements (size, weight, power and accuracy) for each antenna in the array make imaging phase array systems difficult to build. These systems often have a single receiving element at the focus of a parabolic reflector. Closing the phase across the array requires highly precise phase delay control electronics.

FIG. 1 is an example of a 25 element linear array showing 25 beam angles. Each beam angle is created by correlating the amplitude and phase information from all 25 antennas. For Nyquist sampling, each antenna must have a minimum phase sample resolution of ($\phi$/50) radians, where each individual antenna has a beamwidth of $\phi$ radians. The amplitude and phase relationship across the array are correlated with angle-of-arrival (AOA) information to form an image of distant sources.

FIG. 2 depicts a four element linear phase array composed of discrete components. Each antenna requires a signal chain having a precise set of active and passive components. As shown, each chain includes a filter, an LNA, a phase shifter, and an LO, as mixer. The mixers require a complex and precise LO distribution network for temporal phase integrity. Each signal chain has its own phase shift network in order to align the phase of the incoming signal across the array.

On the other hand, as will be explained, the present invention provides a completely passive array with no requirements for a local oscillator or mixer, and no requirements for an intermediate frequency (IF) chain in each of the signal paths of the antennas. In addition, no preamplifiers are required and no phase shifters are required. In fact, the present invention provides for simpler and less expensive components than those components required for the phased array shown in FIG. 2.

SUMMARY OF THE INVENTION

To meet this and other needs, and in view of its purposes, the present invention provides a passive phased array imager. The imager includes (a) a plurality of antennas, disposed on a substrate, for receiving a wavefront from a target, (b) a coplanar waveguide, disposed in the substrate and coupled to the plurality of antennas, for selecting a frequency of interest from the received wavefront, and (c) a plurality of detectors, disposed across the coplanar waveguide for sampling the received wavefront, and providing multiple output voltages to an imaging circuit for displaying information contained in the received wavefront. The frequency of interest is a resonant frequency dependent on a predetermined length between two adjacent antennas coupled to the coplanar waveguide. The plurality of antennas includes at least two dipoles coupled to the coplanar waveguide, and the two dipoles are spaced by a predetermined length to provide a standing wave at the frequency of interest. The predetermined length is any multiple of a quarter of a wavelength at the selected frequency of interest. The plurality of antennas may include two additional dipoles coupled to the coplanar waveguide. The two additional dipoles surround the at least two dipoles, and the two additional dipoles are spaced by any multiple of a quarter wavelengths, in which a wavelength is related to the frequency of interest.

The coplanar waveguide includes two parallel line strips on the substrate, and each antenna includes two perpendicular line strips on the substrate, each perpendicular line strip extending in opposite and perpendicular directions from a respective parallel line strip. Each perpendicular line strip has a length of at least a quarter of a wavelength at the selected frequency of interest. The plurality of detectors are disposed between two adjacent antennas, in which the two adjacent antennas are spaced by one wavelength of the frequency of interest. The plurality of detectors used to measure the field strength within the wave guide are periodically spaced on the interior or on the exterior of the coplanar waveguide. An input side of each detector is connected to one line strip of the coplanar waveguide.

The periodically spaced detectors are configured to provide a distributed element waveguide, in which an intrinsic impedance of the waveguide depends on periodic spacing of the detectors. The distributed element for measuring the field strength within the waveguide includes a first isolation device between the input side of each detector and the one line strip of the coplanar waveguide. The distributed element waveguide includes a second isolation device between the output side of each detector and the other line strip of the coplanar waveguide.

The detectors are periodically spaced from each other by a delta distance. The detectors are configured to sample voltages of the received wavefront and changes in phase of the received wavefront. The wavefront includes a standing wave of the selected frequency of interest.

Another embodiment of the present invention is a passive phased array imager. The imager includes: multiple antenna arrays arranged radially about a center location to form a radial antenna array cell (RAAC). Each antenna array includes: (a) a plurality of antennas, disposed on a substrate, for receiving a wavefront from a target; (b) a coplanar waveguide, disposed in the substrate and coupled to the plurality of antennas, for selecting a frequency of interest from the received wavefront; and (c) a plurality of detectors, disposed across the coplanar waveguide for sampling the received wavefront, and providing multiple output voltages to an imaging circuit for displaying the information contained with the received wavefront. Each antenna array is arranged 40 degrees from an adjacent antenna array, and nine antenna arrays are arranged 40 degrees from each other to form the RAAC. The RAAC is configured to provide a composite beam of +/−60 degrees elevation and +/−180 degrees in azimuth. Angular resolution along each of the nine antenna arrays is a function of the number of detectors disposed across the coplanar waveguide of a respective antenna array. Polarization type of the received wavefront is determined by processing the multiple output voltages from three of the nine antenna arrays.

The phased array imager may include a hexagonal tessellation formed from the RAAC and six additional RAACs that are the same as the RAAC. The hexagonal tessellation is comprised of a center disposed RAAC and the six additional RAACs stacked around a periphery of the center disposed RAAC. Additional RAACs are included, in which the additional RAACs are stacked around a periphery formed by the hexagonal tessellation.

The phased array imager may include a read out integrated circuit (ROIC) coupled to the plurality of detectors for receiving the multiple output voltages and providing the output voltages to a display.

Yet another embodiment of the present invention is a passive phased array imager comprising:
 (a) multiple quad cells;
 (b) wherein each quad cell includes:
 (c) two first antenna arrays and two second antenna arrays,
 (d) the first and second antenna arrays are arranged perpendicular to each other, and
 (e) the first two antenna arrays are parallel to each other, and
 (f) the second two antenna arrays are parallel to each other.
In addition, each antenna array includes:
 (a) a plurality of antennas, disposed on a substrate, for receiving a wavefront from a target,
 (b) a coplanar waveguide, disposed in the substrate and coupled to the plurality of antennas, for selecting a frequency of interest from the received wavefront, and
 (c) a plurality of detectors, disposed across the coplanar waveguide for sampling the received wavefront, and providing multiple output voltages to an imaging circuit for displaying the received wavefront.

The multiple quad cells may be stacked to form a 3×7 matrix of quad cells. The multiple quad cells may be stacked to form an array of n×m quad cells, in which n is the number of quad cells in a row, and m is the number of quad cells in a column.

It is understood that the foregoing general description and the following detailed description are exemplary, but are not restrictive, of the invention.

BRIEF DESCRIPTION OF THE DRAWINGS

The invention may be best understood from the following detailed description when read in connection with the accompanying drawing. Included in the drawing are the following figures:

FIG. 2 is a conventional four element phased array with discrete components.

FIG. 3 is an example of a CMOS four element passive phased array, in accordance with an embodiment of the present invention.

FIG. 4A is an example of a resonant antenna array with four dipole antennas arranged across a coplanar waveguide structure, in accordance with an embodiment of the present invention.

FIG. 4B shows two standing waves detected by the antenna array of FIG. 4A, in which the peak shifts position with angle of incidence of the incoming wavefront.

FIG. 5 is an example of a digital lens providing a focus point for a chosen phase relationship, due to the detectors sampling an incoming wavefront in the antenna array of FIG. 4A.

FIG. 7B provides two examples of detectors that may be used in the antenna array of FIG. 4A.

FIG. 8 is an example of a radial antenna array cell (RAAC) that includes nine antenna arrays arranged in a radial formation, wherein each antenna array is similar to the antenna array shown in FIG. 4A, in accordance with an embodiment of the present invention.

DETAILED DESCRIPTION OF THE INVENTION

Figure 1:
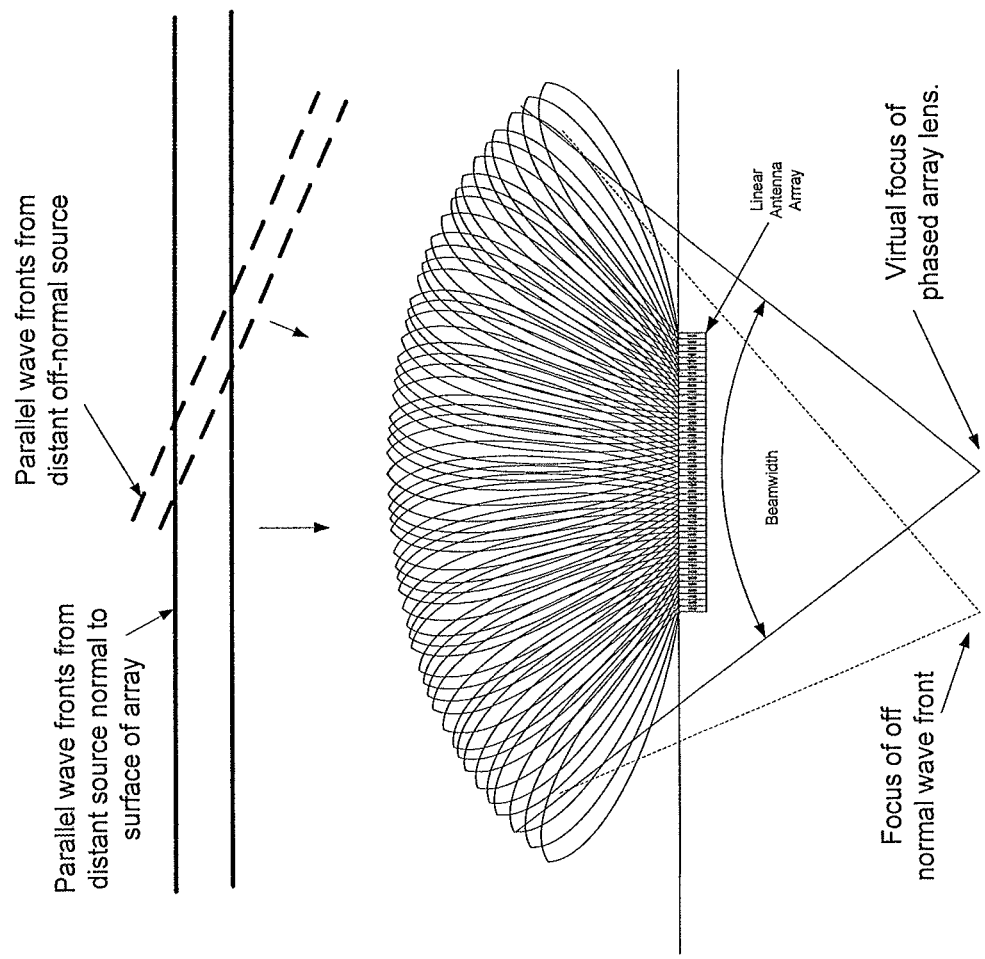
FIG. 1 is an example of a 25 element antenna array showing discrete beam angle mapping for both a normal incidence wave and an off-normal wave.

The present invention allows for construction of an ideal lens by sampling incoming phase and amplitude of a signal from a target along a sparse aperture. The aperture is populated with many dipole array cells, in which each dipole array cell develops a standing wave based on the angle of arrival (AOA) of the incoming signal from the target. Each dipole array is disposed along a waveguide structure, as will be described.

In addition, the signal coming into the lens array is oversampled along the waveguide structure using multiple detectors. The resolving limit of the signal is based on the detector spacing on the waveguide. For example, if 2048 detectors are placed across a 2π waveguide structure, then 1024 phase centers (pixels) may be resolved by the lens array. The individual phase centers may be de-convolved at a Nyquist resolution of 2× the sample distance.

Referring first to FIG. 3, an example of a passive phased array system is shown. The system, as shown, is a linear four element phased array implemented in CMOS technology. The system includes four antennas, each designated as 31; a waveguide 32; integrated circuit (ROIC) 34 and an analog-to-digital (λ/D) converter 35. The multiple antennas receive individual signals, each having a different amplitude and phase, as a wavefront is received from a target. A standing wave is generated within waveguide 32, which is sampled by the multiple detectors 33 that are disposed across the waveguide 32. Each of the detectors provides a voltage output that is read out by a conventional ROIC 34. For example, one row of n detectors 33 can be simultaneously sampled as one row in a n×m (n rows by m columns) ROIC. The simultaneously sampled output row of voltages from the ROIC is converted into a digital signal by λ/D converter 35. Although not shown, the output from λ/D converter 35 may be sent to a display for viewing by an end user.

The phase integrity of the wavefront received by the system shown in FIG. 3 is a function of the detector spacing, which is controlled by the CMOS fabrication lithography. This eliminates any need for a precision local oscillator (LO) network, as required for the system shown in FIG. 2. In addition, the overall size of the system can be greatly reduced, because a large number of integrated antennas (more than the 4 antenna elements shown as an example in FIG. 2) can be fabricated on a single silicon wafer. It will be understood that as little as two antenna elements (or two dipoles) may be configured in one array of the system, or as many as six to eight or more antenna elements (or six to eight or more dipoles) may be configured in one array of the system.

The present invention allows for discrete over sampling of phase of the incoming signal by taking advantage of the standing wave generated within a waveguide. With high responsivity detection, no pre-amplifier is required and, at the same time, the waveguide acts like a pre-selector for the frequency of interest. As a coherent imaging system, the amplitude and phase relationship is critical to angle of incidence and, thus, to the resolution. For this system the precise amplitude and phase knowledge between antennas is derived from the spatial location knowledge of each antenna array, which is controlled by the lithography accuracy of the CMOS waveguide. For a sparse aperture array of any size, if the structural integrity can be maintained within a few hundredths of a wave, than a phase relationship can be calibrated out. With multiple samples over 2π radians, the phase can be correlated at a specific frequency (high cavity Q) for relatively small shifts in phase. When the signal to noise ratio (SNR) is high, this property allows for very precise amplitude and phase measurements, up to the wavelength (λ) divided by the diameter of the collection optics (D), or the λ/D limit. When the SNR is low, however, additional processing allows for moderate amplitude and phase measurements.

FIG. 4A depicts a resonant 220 GHz antenna array with four dipole antennas arranged across a coplanar waveguide (CPW) structure to provide a full 2π standing wave within the central portion of the waveguide. The figure is intended as an example as any other wavelength A may be used by the present invention. In addition, it will be understood that the central portion can be any number of ¼ wavelengths and may include a multitude of periodically spaced detectors along the interior of the waveguide. Furthermore, the two end sections of the waveguide, shown in the figure, may be omitted, thereby providing a two element array. The field generated between the elements of the waveguide is sampled by the detectors, such that many samples of a single cycle of the resonant wave are collected.

The antenna array, generally designated as 40, of FIG. 4A includes, as an example, four dipole antennas 41 spaced along a distance of 2λ. The dipole antennas are spaced by ½λ at the two end sections and by λ at the middle section. The middle section, however, need not be of a length of λ, but may have a length of any multiple number of ¼λ. Again, the end section may also be omitted, thereby providing a two element array. Alternatively, as many as six to eight or more dipoles may be included in the configuration of the single antenna array. Thus, the middle section may be as shown in FIG. 4A, but more than two dipoles may be added to the end sections of the single antenna array.

As shown, multiple detectors 43 are equally distributed along the middle section of the coplanar waveguide and are disposed in the interior of coplanar waveguide 42, the latter formed by two trace lines on a substrate. The detectors 43 are included as an integral part of the distributed nature of the impedance along the coplanar waveguide. The field generated between the dipole elements 41 of coplanar waveguide 42 is shown as a standing wave 44A. All the detectors are simultaneously turned ON to sample the incoming front across the antenna array.

The voltage intensity of the standing wave formed across the antenna array varies as a function of its location along the middle section. As shown in FIG. 4B, standing wave 44B has a shifted peak as compared to the peak location of standing wave 44A. The peak of the standing wave shifts position with the angle of incidence (AOI) of the wavefront with respect to coplanar waveguide 42. As a resonant wave is received by the dipole antennas, a standing wave is generated in the middle section of the waveguide and simultaneously sampled by the multiple detectors 43, so that many samples of the single resonant wave are collected. In the figures shown, only one detector 43 may detect a peak voltage, while the other detectors 43 may detect voltage samples lower than the peak voltage.

The more detectors disposed in the middle section of the antenna array, the more oversampling is possible of the incoming wavefront; the more detectors disposed in the middle section, the narrower is the resulting lobe, or phase center of each detector. Thus, for example, with 2048 detectors disposed across a 2π waveguide, 1024 phase centers (or pixels) can be resolved. Each phase center has a Nyquist resolution of 2× the sample distance. In addition, the relative correlation amplitude is a function of the amount of signal at a particular angle of arrival of the wavefront.

Figures 4C, 4D:
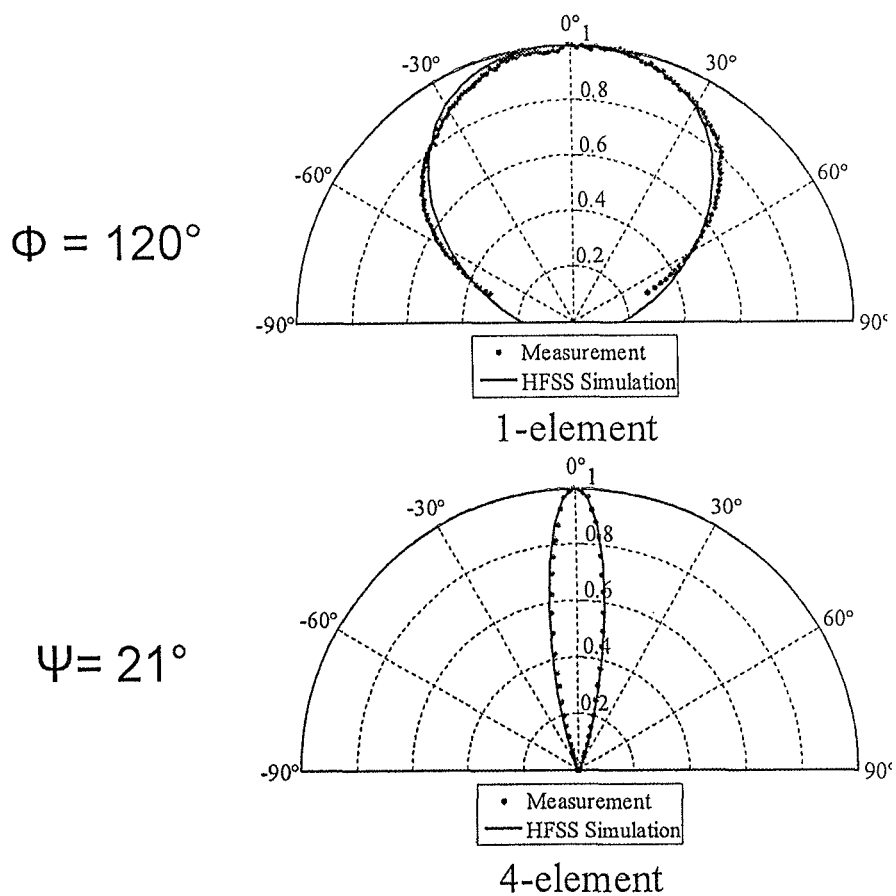
FIGS. 4C and 4D are examples of in-track and cross-track solid beam angles, respectively, versus gain resulting from the 4×1 dipole antenna array of FIG. 4A.

FIGS. 4C and 4D depict examples of antenna beam formations for the 4-element dipole array shown in FIG. 4A. The in-scan (across the page) field-of-view (FOV) beam width formed by the 4-element dipole array is 120 degrees; the cross-scan (up and down the page) FOV beam width is also 120 degrees. It will be appreciated, however, that in the in-scan direction, with proper amplitude phase alignment between the four elements, the four elements together form an equivalent single element beam width of 21 degrees as shown in FIG. 4D, while in the cross-scan direction the beam remains 120 degrees. With many individual detectors, the in-scan amplitude and phase relationships required to form multiple discrete lobe angles can each be resolved (correlated) with a 21 degree beam width analogous to FIG. 1.

Reference is now made to FIG. 5, which shows an ideal digital lens formed through the oversampling of array cells and the digital processing of ROIC 34 and ADC 35 (FIG. 3). Assuming that the wavefront is incoming at an angle that is perpendicular to the array cells, the detectors in the array cells detect signals of the wavefront that are correlated among adjacent cells. As an example, three adjacent signals are correlated in phase having phase angles of $\alpha$, $\beta$, and $\epsilon$, respectively. The higher the fidelity of the phase knowledge at each sample point, the closer to ideal the lens performs. The resolving power of this lens is a function of the incoming wavelength and the effective aperture size (the distribution length of the cells).

Figure 11:
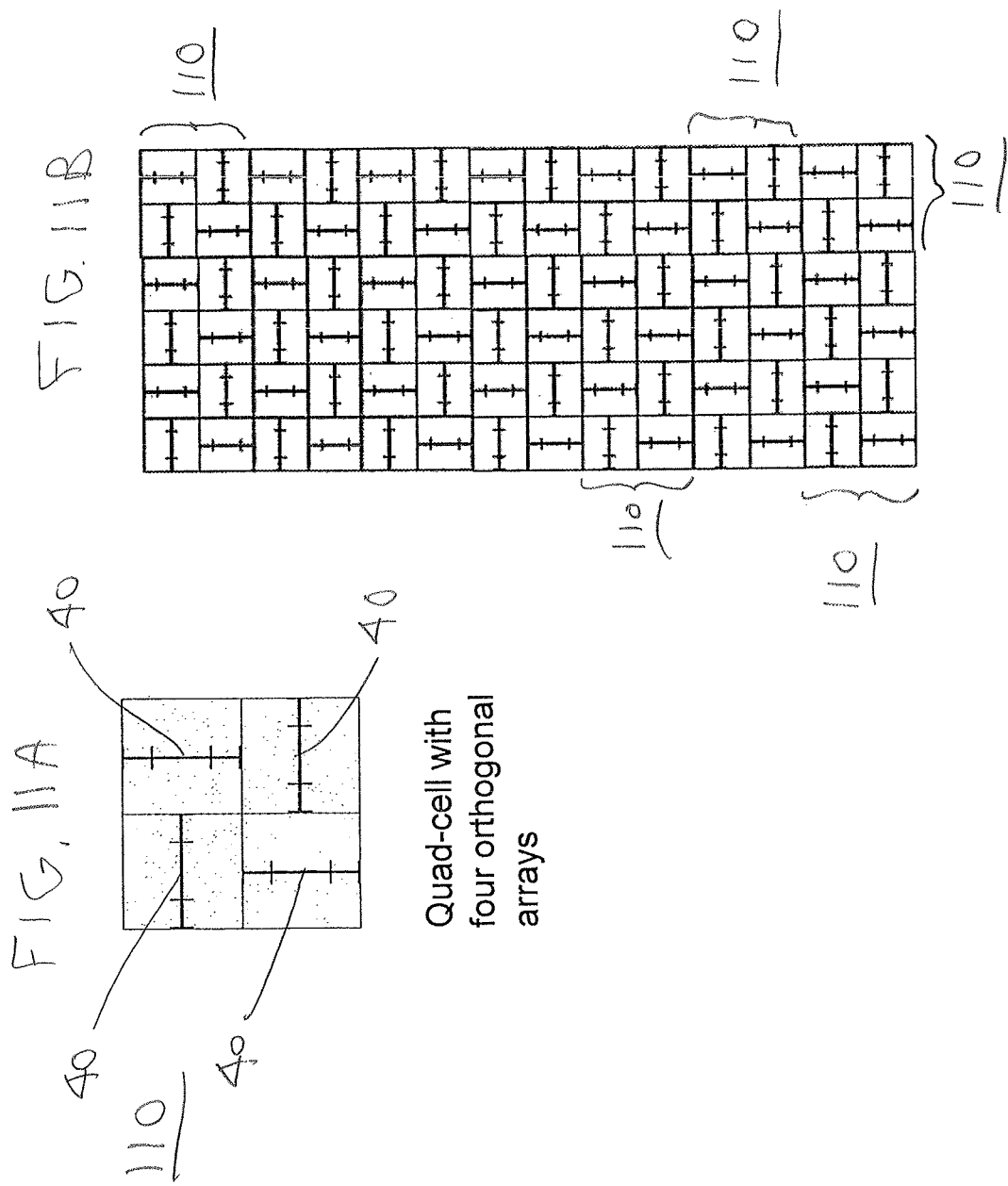
FIG. 11A is an example of a quad-cell including four orthogonal antenna arrays, wherein each antenna array is similar to the antenna array shown in FIG. 4A.
FIG. 11B is an example of a digital lens array including a 3×7 matrix of quad-cells, in accordance with an embodiment of the present invention.

It will be understood that as defined in FIG. 5, a cell includes multiple antenna arrays, in which each antenna array (such as the antenna array shown in FIG. 4A) has a predetermined relationship to another antenna array in the cell. For example, FIG. 8 shows a cell 80 that includes 9 antenna arrays 81-89 in a radial formation. As another example, FIG. 11A show a cell 110 that includes 4 antenna arrays 40 that are orthogonally arranged to each other.

Figure 6:
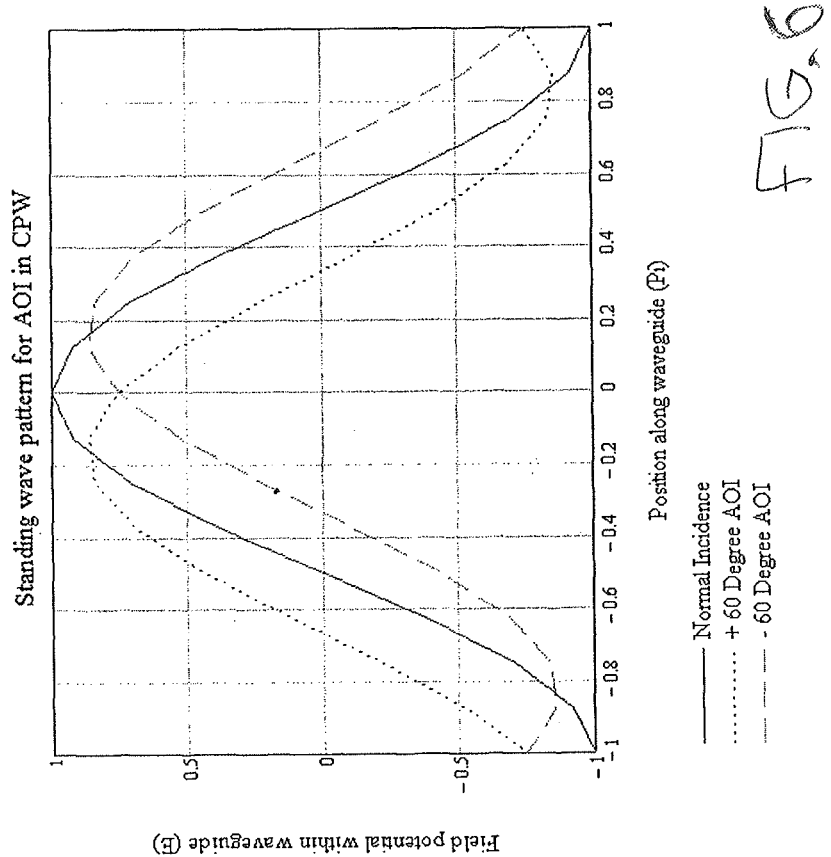
FIG. 6 is an example of the standing waves formed in the coplanar waveguide upon detection, at normal angle of incidence (AOI), +60 degrees of AOI and −60 degrees of AOI.

Referring to FIG. 6, the field potential within the waveguide is plotted as a function of position along the waveguide. The individual standing wave patterns in the waveguide are shown for three different arrival angles of the wavefront, e.g. at normal angle of incidence (AOI), +60 degrees AOI and −60 degrees AOI. The 3 dB points for each standing wave covers a range of elevation (in-scan) of −60 degrees to +60 degrees and azimuth (cross-scan) of −10 degrees to +10 degrees. Nine azimuth orientations are needed to provide enough beam overlap to form an ideal lens with a FOV of 120 degrees, an azimuth of 360 degrees and an elevation of +/−60 degrees (the nine azimuth orientations are described later).

Figure 7A:
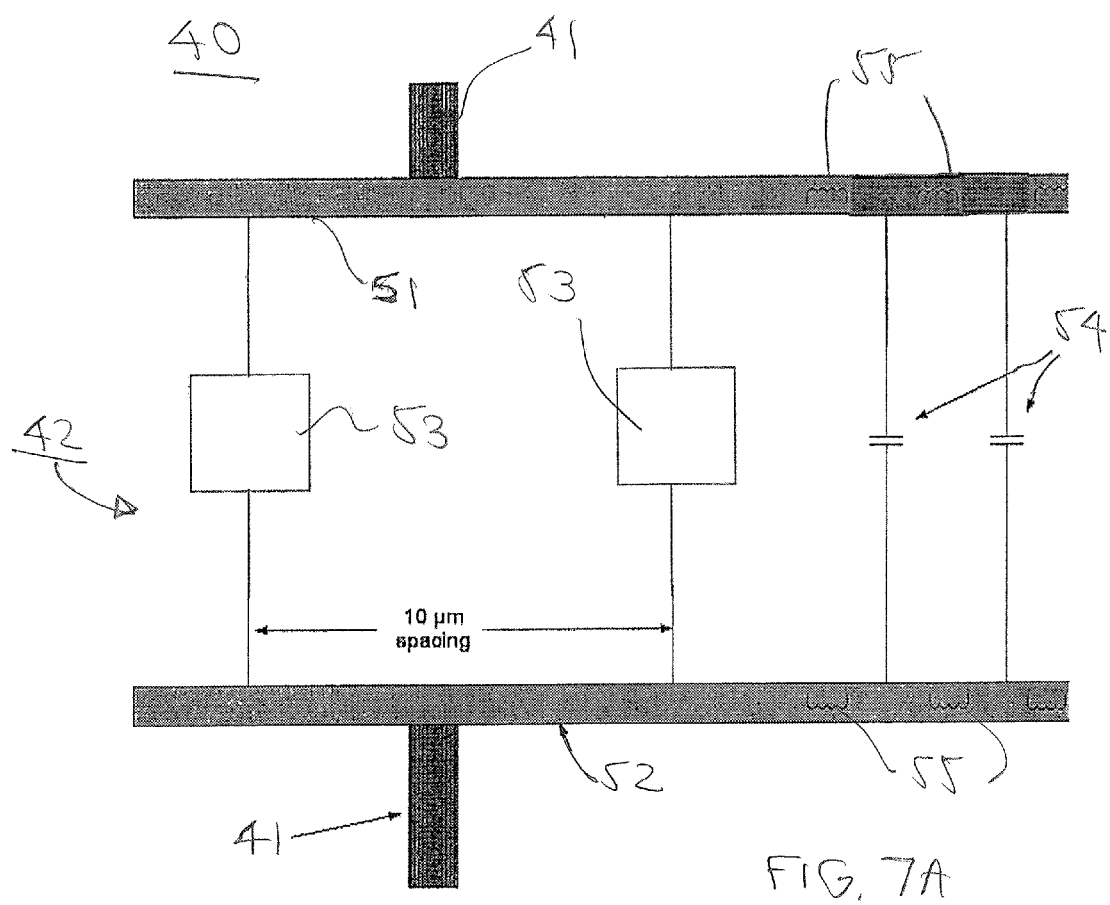
FIG. 7A is a section of the antenna array of FIG. 4A, in which the detectors are sandwiched between two strip lines of the coplanar waveguide structure.

FIG. 7A illustrates a section of a coplanar waveguide and a portion of the integral detectors in antenna array 40. The coplanar waveguide 42 is comprised of two strip lines, each designated as 51 and 52, respectively. Two detectors 53 are shown coupled between strip lines 51 and 52. As shown, the spacing between each detector is 10 microns, but may be much smaller on a scale of nanometers (for example, 10 nanometers). The periodic placement of detectors along strip lines 51 and 52 preserves the distributed nature of the waveguide, in which the intrinsic impedance of the waveguide is dependent on the periodic loading of the detectors (high impedance relative to the waveguide). The impedances of the detectors in this example look capacitive in nature (as exemplified by capacitors 54 and coils 55). The spacing interval of the detectors along the length of the waveguide determines the delta in phase, or sub-wavelength sample size.

The detector geometry is small relative to the waveguide structure. Each waveguide (in the middle section) may have hundreds, or thousands of field detectors along its length. The isolation between each field detector and the strip lines of the waveguide is a key parameter to the number of phase samples that are possible in the middle section. Thus, each detector must be isolated from the waveguide. As shown in FIG. 7B, each side of detector 53 includes a direct current decoupling means in the form of a capacitor 54 that is interposed between a detector and a strip line. The decoupling means, or isolation means may also include a coil device.

Two examples of detector types are included. Detector 53A is an isolated MOM diode detector, whereas detector 53B is a plasmonic MOSFET detector. Due to occupying less space, when using MOM diode detectors, the waveguide may include 2000 detectors, whereas when using the plasmonic detector, which occupies more space, only 100s of detectors may be fitted in the middle section of the waveguide. The circuitry shown connected to the detectors (either 53A or 53B) are there to show that current must be supplied across each of the detectors. The Vpixel output shown in detector 53B, for example, may be used to provide the read-line output to an ROIC.

Figure 7C:
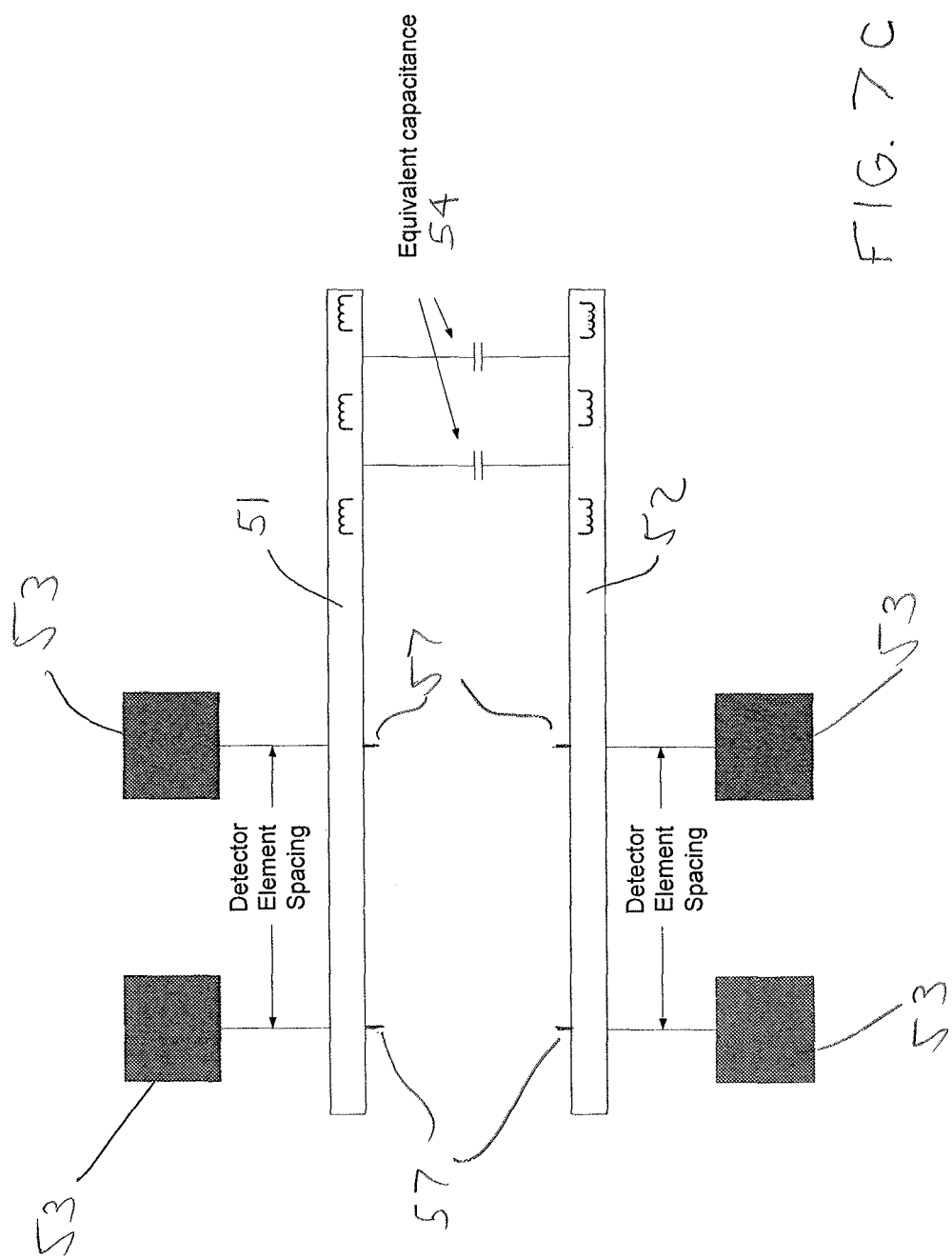
FIG. 7C is another example of the antenna array of FIG. 4A, in which the detectors are external of the coplanar waveguide structure.

FIG. 7A provides a section of the antenna array in which the detectors are sandwiched between two strip lines of the coplanar waveguide structure. FIG. 7C provides another example of the antenna array of FIG. 4A, in which the detectors are external of the coplanar waveguide structure. Probes 57 are shown, in which each probe is a short wire isolated from the guide walls 51, 52 that extend into the cavity by a short distance. The probes sample the electric field relative to the walls along the length of the waveguide. The electric field travels between the walls, or plates 51, 52 of the waveguide.

As described above, nine azimuth orientations are needed to provide enough beam overlap to form an ideal lens with a field of view (FOV) of 120 degrees, an azimuth of 360 degrees and an elevation of +/−60 degrees. Referring now to FIG. 8, nine antenna arrays are arranged in the formation of a radial antenna array cell (RAAC). One RAAC is generally designated as 80 and includes nine antenna arrays, designated, respectively, 81 through 89. Each antenna array 81-89 may be similar to the antenna array 40, shown in FIG. 4A. As previously described, each antenna array may have two or more dipoles. In the case of two dipoles, the antenna array 81-89 does not have a middle section; in the case of four or more dipoles, the antenna array 81-89 has a middle section and end sections.

Figure 9A:
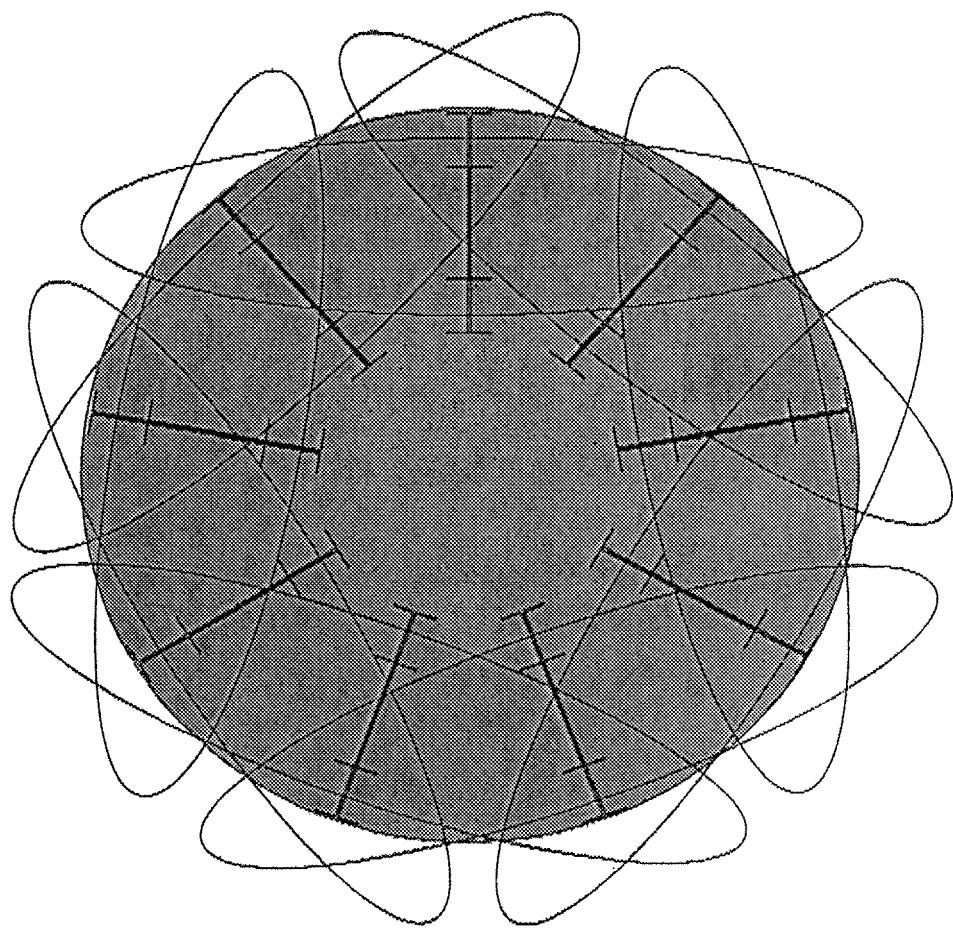
FIG. 9A is an actual beam pattern formed by the nine antenna arrays shown in FIG. 8.
Figure 9B:
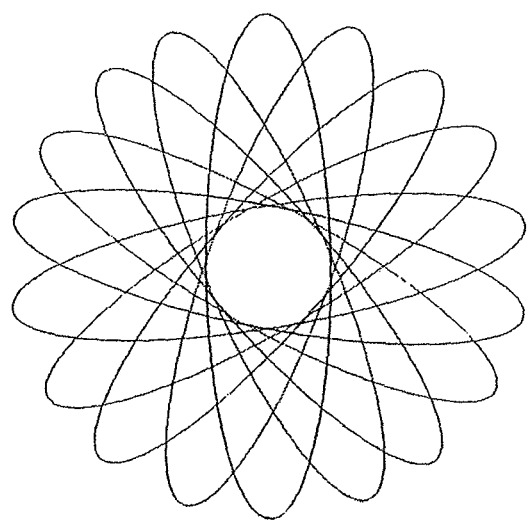
FIG. 9B is an equivalent beam pattern formed by the nine antenna arrays shown in FIG. 8 providing a digital lens.

As shown in FIGS. 9A and 9B, the RAAC has a composite beam configuration of +/−60° in elevation (in-scan); The RAAC also has a composite beam configuration of +/−180° in azimuth (cross-scan), in which each beam covers 20 degrees. The angular resolution along each of the nine radial arrays is ($\pi$/number of samples)=$\Delta\theta$. FIG. 9A shows the actual beam pattern of each of the nine element arrays in the RAAC. Nine beams are shown that overlap each other to form a +/−60 degrees FOV. FIG. 9B shows the equivalent beam pattern of the nine element array, when the RAAC is processed as a digital lens. Eighteen beams are shown.

With the nine radials (or nine antenna arrays) shown in FIG. 8, the present invention advantageously is able to determine the polarization of the incident wave. This may be accomplished by measuring the standing waves received by three sets of radials that are 120 degrees apart from each other. Using any three symmetric rotations of radials (found 120 degrees apart from each other) about an RAAC allows determination of the polarization. Polarization may be obtained, for example, by using Stokes Vectors to calculate the orientations.

Figure 10:
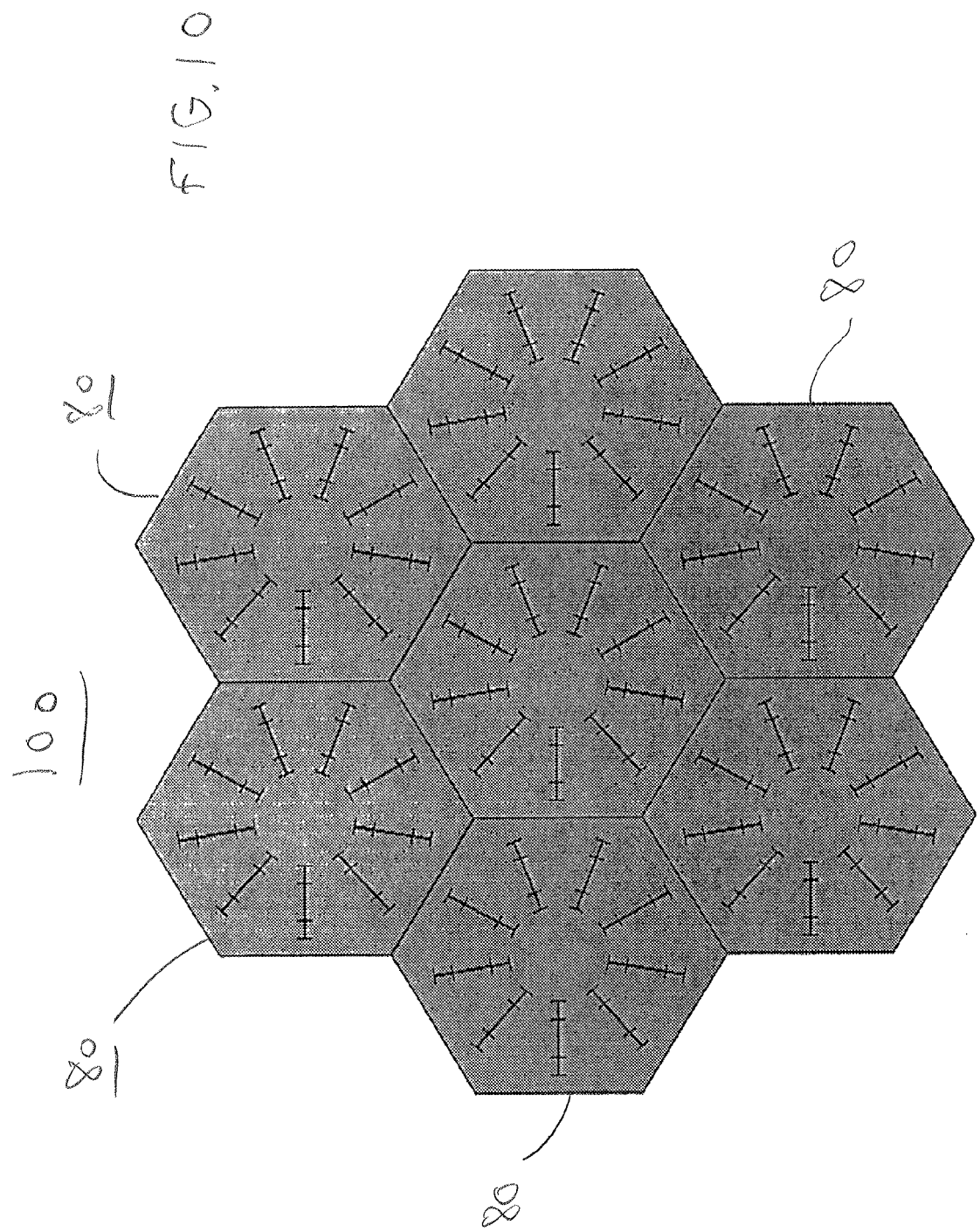
FIG. 10 is an example of an hexagonal tessellation that includes one centered RAAC and six RAACs disposed around the centered RAAC, in accordance with an embodiment of the present invention.

FIG. 10 shows one of many possible focal plane arrangements in the form of a hexagonal tessellation. The hexagonal tessellation, generally designated as 100, includes seven RAACs that are stacked one on top of each other. As shown, the central RAAC 80 includes six other RAACs 80 that surround the central RAAC. Each RAAC 80 can recover $\pi$/2 phase centers from 2× nine azimuthal directions. This arrangement provides for many possible processed signal products including, but not limited to amplitude/phase interferogram, 3D images, and terrain/contour maps.

FIGS. 11A and 11B show another possible focal plane arrangement in the form of a quad-cell, designated generally as 110. Each quad-cell includes four orthogonal antenna arrays 40. Each antenna array 40 is similar to the antenna array shown in FIG. 4A. A basic 3D linear antenna array formation may be formed with the array depicted in FIG. 11B.

As shown, the array includes a 3×7 matrix of quad-cells 110.

Figure 12:
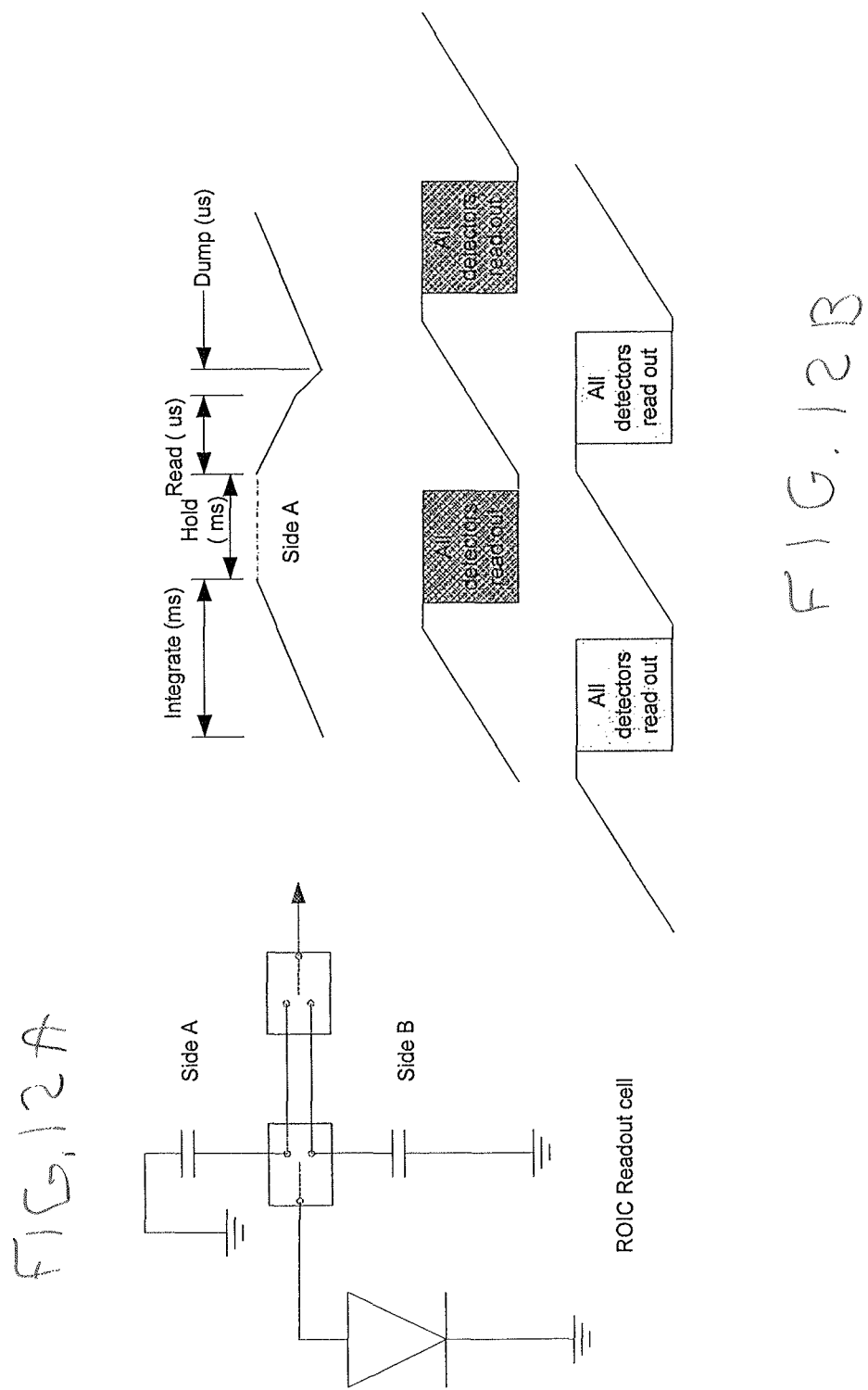
FIGS. 12A and 12B are conceptual diagrams showing examples of continuous high speed detection using an ROIC readout cell provided by the present invention.

As described before, the detectors in each antenna array are all turned on simultaneously. In order to detect the wavefront simultaneously with all the detectors in the array, the invention uses methods for continuous high speed detection. A possible method is conceptually depicted in FIGS. 12A and 12B. FIG. 12A depicts an ROIC readout cell switching the read-out from side A to side B. Thus, as shown in FIG. 12B, one side integrates while the other side reads-out. At least one side is integrating at all times. An integration clock may be used to switch from side to side.

Figure 13:
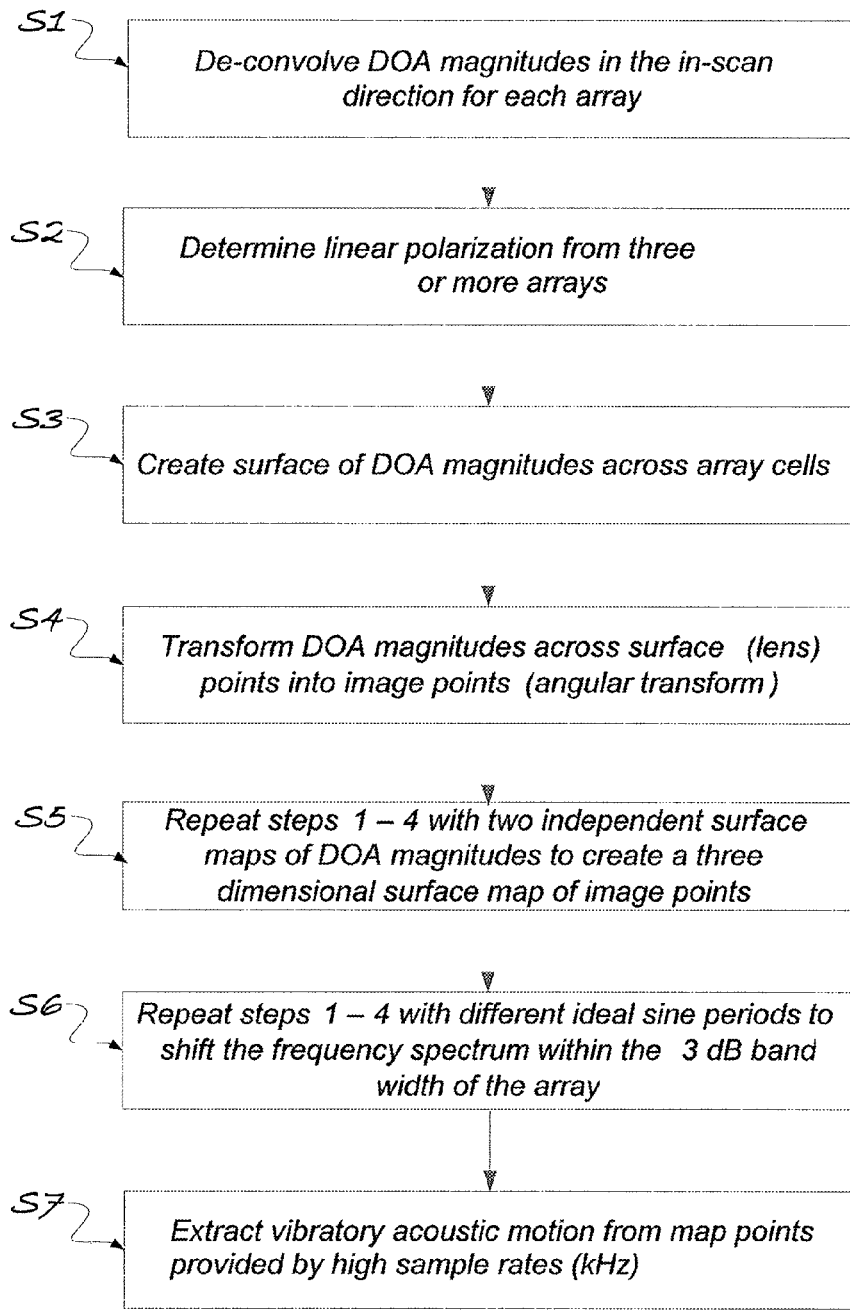
FIG. 13 is an example of a method used by the present invention to determine phase, amplitude and polarization of an incoming wavefront and display the same in one, or more dimensional space.

Turning next to FIG. 13, an example of a method of the present invention is provided. A method for over sampling the phase and amplitude of a coherent incoming wavefront includes sampling each signal detected by a respective detector in each antenna array, in which multiple detectors are disposed in a coplanar waveguide. The signal's direction of arrival (DOA) is de-convolved as a function of phase angle from −π to +π for each antenna array (step S1). Effectively, each detector output provides a sinusoidal wave having a peak corresponding to a particular angle of arrival of the sine wave. For the single source case, correlating all the sine waves against one ideal sine wave provides a correlation peak corresponding to the incoming wavefront direction of arrival. Each sine wave (detector) has the potential to have an independent correlation peak, the relative magnitude of which corresponds to the relative signal strength from that direction. The correlation peak position is correlated with the wave front direction while the magnitude is correlated with the relative signal strength of that wave front.

A one-dimensional DOA is provided by one antenna array. A two-dimensional position is resolved by any two antenna arrays (also referred to herein as a cell) where the resolution is a function of the array separation. With a two dimensional array, a surface map of phase and amplitude peaks can be created. The surface map is then processed by a mathematical image reconstruction algorithm (S4), as depicted in FIG. 5, to create a virtual image at an image plane. An image is created by correlating the phase and amplitude across at least three antenna arrays in a cell to form a surface (S3) (for example, see the RAAC in FIG. 8, or the quad-cell in FIG. 11A).

Linear polarization losses can be resolved by using at least three radially symmetric antenna arrays that are 120 degrees apart from each other (S2).

Further, it may be appreciated that, by de-convolving amplitude and phase into DOA and forming two independent surfaces, with enough separation to provide a distinguishable amount of parallax, a three dimensional image can be formed at an ideal surface of focus (S5). This process can be repeated (S1, S2, S3 and S4) for wavelengths that are within the 3 dB resonance bandwidth of the antenna array, and can produce a sufficient standing wave within the wave guide, by adjusting the period of the ideal sine wave used in the de-correlation (S6).

Additionally, with high sampling rates (kHz) and long aperture baselines, vibratory motion in the position of the phase correlation peaks can be resolved (S7).

It will be understood that phased array imaging at any wavelength may be provided by the present invention, so long as a standing wave may be supported in a wave guide structure.

Possible applications for the present invention are Synthetic Aperture Radar (SAR), Interferometric Synthetic Aperture Radar (InSAR or IFSAR) including other forms of coherent as well as incoherent imaging, 3D interferometric imaging, topographic imaging with amplitude, phase and interferogram overlaid on amplitude, real time target tracking, direction finding, and many other applications related to phase interferometry.

The finite structure of a reflective surface produces noise in the phase information. This scattering of the phase not only reduces the coherence of the return signal detected within the waveguide, but is also a function of the surface structure and possibly can provide information in terms of the relationship between diffuse scatter vs. specular reflection in the sample. It may be possible to develop phase scatter signatures for different surface structures and/or materials when sufficient SNR and phase coherence is available.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A passive phased array imager comprising:
 a plurality of antennas, disposed on a substrate, for receiving a wavefront from a target, the plurality of antennas including two adjacent antennas that are spaced apart;
 a coplanar waveguide, disposed in the substrate and coupled to each of the plurality of antennas, for selecting a frequency of interest from the received wavefront,
 a plurality of detectors, disposed between the two adjacent antennas across the coplanar waveguide for sampling the received wavefront, and providing multiple output voltages to an imaging circuit for displaying information contained in the received wavefront, wherein:
 the two adjacent antennas are spaced apart by one wavelength of the frequency of interest, and
 the plurality of detectors measure a field strength within the waveguide and are periodically spaced on the interior or on the exterior of the coplanar waveguide, wherein:
 the plurality of detectors are configured to provide a distributed element waveguide,
 an intrinsic impedance of the distributed element waveguide depends on periodic spacing of the detectors, and
 an input side of each detector is coupled to at least one line strip of the coplanar waveguide.

2. The phased array imager of claim 1 wherein
 the frequency of interest is a resonant frequency dependent on a predetermined length between two adjacent antennas coupled to the coplanar waveguide.

3. The phased array imager of claim 1 wherein
 the plurality of antennas includes at least two dipoles coupled to the coplanar waveguide, and
 the two dipoles are spaced by a predetermined length that provides a standing wave within the coplanar waveguide at the frequency of interest.

4. The phased array imager of claim 3 wherein
 the predetermined length is any multiple of a quarter of a wavelength of the selected frequency of interest.

5. The phased array imager of claim 3 wherein
 the plurality of antennas includes two additional dipoles coupled to the coplanar waveguide,
 the two additional dipoles surround the at least two dipoles, and
 the two additional dipoles are spaced by any multiple of a quarter wavelength, in which a wavelength is related to the frequency of interest.

6. The phased array imager of claim 1 wherein
 the coplanar waveguide includes two parallel line strips on the substrate, and each antenna includes two perpendicular line strips on the substrate, each perpendicular line strip extending in opposite and perpendicular directions from a respective parallel line strip, and each perpendicular line strip has a length of at least a quarter of a wavelength at the selected frequency of interest.

7. The phased array imager of claim 1 wherein
the distributed element for measuring the field strength within the waveguide includes a first isolation device between the input side of each detector and the one line strip of the coplanar waveguide, and
the distributed element waveguide includes a second isolation device between the output side of each detector and the other line strip of the coplanar waveguide.

8. The phased array imager of claim 1 wherein
the detectors are periodically spaced from each other by a delta distance,
the detectors are configured to sample voltages of the received wavefront and changes in phase of the received wavefront, and
the wavefront includes a standing wave of the selected frequency of interest.

9. A passive phased array imager comprising:
multiple antenna arrays arranged radially about a center location to form a radial antenna array cell (RAAC), wherein each antenna array includes:
a plurality of antennas, disposed on a substrate, for receiving a wavefront from a target,
a coplanar waveguide, disposed in the substrate and coupled to the plurality of antennas, for selecting a frequency of interest from the received wavefront, and
a plurality of detectors, disposed across the coplanar waveguide for sampling the received wavefront, and providing multiple output voltages to an imaging circuit for displaying the information contained with the received wavefront,
wherein a polarization type of the received wavefront is determined by processing the multiple output voltages from three of nine antenna arrays.

10. The phased array imager of claim 9 wherein:
each antenna array is arranged 40 degrees from an adjacent antenna array, and the nine antenna arrays are arranged 40 degrees from each other to form the RAAC.

11. The phased array imager of claim 9 wherein
the RAAC is configured to provide a composite beam of +/−60 degrees elevation and +/−180 degrees in azimuth, and
angular resolution along each of the nine antenna arrays is a function of the number of detectors disposed across the coplanar waveguide of a respective antenna array.

12. The phased array imager of claim 9 including:
a hexagonal tessellation formed from the RAAC and six additional RAACs that are the same as the RAAC,
wherein the hexagonal tessellation is comprised of a center disposed RAAC and the six additional RAACs stacked around a periphery of the center disposed RAAC.

13. The phased array imager of claim 12 including:
further additional RAACs,
wherein the further additional RAACs are stacked around a periphery formed by the hexagonal tessellation.

14. The phased array imager of claim 9 including:
a read out integrated circuit (ROIC) coupled to the plurality of detectors for receiving the multiple output voltages and providing the output voltages to a display.

15. A passive phased array imager comprising:
multiple quad cells;
each quad cell including two first antenna arrays and two second antenna arrays, wherein:
each of the first antenna arrays is arranged perpendicular to each of the second antenna arrays,
the first antenna arrays are parallel to each other, and
the second antenna arrays are parallel to each other;
each antenna array of the two first antenna arrays and the two second antenna arrays including:
a plurality of antennas, disposed on a substrate, for receiving a wavefront from a target, the plurality of antennas including two adjacent antennas that are spaced apart;
a coplanar waveguide, disposed in the substrate and coupled to the plurality of antennas, for selecting a frequency of interest from the received wavefront, and
a plurality of detectors, disposed between two adjacent antennas across the coplanar waveguide for sampling the received wavefront, and providing multiple output voltages to an imaging circuit for displaying the received wavefront, wherein each antenna array:
the two adjacent antennas are spaced apart by one wavelength of the frequency of interest, and
the plurality of detectors measure a field strength within the waveguide and are periodically spaced on the interior or on the exterior of the coplanar waveguide, wherein:
the plurality of detectors are configured to provide a distributed element waveguide,
an intrinsic impedance of the distributed element waveguide depends on periodic spacing of the detectors, and
an input side of each detector is coupled to at least one line strip of the coplanar waveguide.

16. The passive phased array imager of claim 15 wherein
the multiple quad cells are stacked to form an array of n×m quad cells,
wherein n is the number of quad cells in a row, and m is the number of quad cells in a column.

17. The passive phased array imager of claim 16 including:
a read out integrated circuit (ROIC) coupled to the plurality of detectors in each quad cell;
wherein the ROIC receives the multiple output voltages from the array of n×m quad cells and reformats the output voltages for display.

* * * * *